United States Patent

Bachman et al.

Patent Number: 5,537,011
Date of Patent: Jul. 16, 1996

[54] METHOD AND APPARATUS FOR PROMOTING EVEN WEAR IN A MULTIPLE-MOTOR DRIVETRAIN

[75] Inventors: Michael S. Bachman, New Boston; Michael H. Standing, Plymouth; Marc R. Davis, Dearborn, all of Mich.

[73] Assignee: Ford Motor Company, Dearborn, Mich.

[21] Appl. No.: 362,345

[22] Filed: Dec. 22, 1994

[51] Int. Cl.$^6$ ..................................... H02P 1/54
[52] U.S. Cl. ................. 318/99; 318/34; 318/432; 318/8; 318/434
[58] Field of Search .................. 318/99, 34, 51, 318/53, 78, 432, 434, 433, 8, 13, 15

[56] References Cited

U.S. PATENT DOCUMENTS

| | | | |
|---|---|---|---|
| 4,686,434 | 8/1987 | Kojima et al. | 318/78 X |
| 5,345,154 | 9/1994 | King | 318/51 X |
| 5,384,520 | 1/1995 | Yang | 318/432 X |
| 5,414,339 | 5/1995 | Masaki et al. | 318/434 X |
| 5,420,486 | 5/1995 | Wilson | 318/8 X |
| 5,422,550 | 6/1995 | McClanahan et al. | 318/34 X |

*Primary Examiner*—William M. Shoop, Jr.
*Assistant Examiner*—Karen Masih
*Attorney, Agent, or Firm*—Mark S. Sparschu

[57] ABSTRACT

An invention is disclosed which promotes even wear within a multiple-motor drivetrain. In one embodiment of the invention, a vehicle drivetrain includes two motors. The total torque to be provided by the motors is partitioned between the motors such that the total efficiency of the drivetrain is maximum. Such partitioning usually involves providing more torque from one motor than from the other. The motor selected to provide the greater torque does so until a predetermined number of differential torque-hours are accumulated between the two motors. The other motor is then selected to provide the greater torque, again until a predetermined number of differential torque-hours are accumulated. Excessive wear of one portion of the driveline is thus prevented.

13 Claims, 2 Drawing Sheets

5,537,011

METHOD AND APPARATUS FOR PROMOTING EVEN WEAR IN A MULTIPLE-MOTOR DRIVETRAIN

BACKGROUND OF THE INVENTION

1. Field of the Invention

The present invention relates to control of multiple-motor drivetrains, and more particularly to the control of such a drivetrain to promote even wear within the drivetrain.

2. Description of the Related Art

In control of a vehicle drivetrain having more than one motor, the total torque to be delivered by the drivetrain must be partitioned among the motors of the drivetrain. One way to partition the torque is to simply assign an equal portion of the total torque to each motor (e.g., 50% of the total torque to each motor in a dual-motor drivetrain).

However, where efficiency is an important concern, such as in an electric vehicle, the even split of torque is not the optimal solution. This is true because at a given speed, a motor has an efficiency which is a non-constant function of torque provided by the motor. Because of this, the general case for most operating conditions is that more efficient torque partitioning between the motors in a multiple-motor drivetrain is accomplished by selecting a torque partitioning of other than an even split. Only by chance will an operating condition exist such that an even torque partitioning will be most efficient.

Given that other than an even torque partitioning in a multiple-motor drivetrain is usually the most efficient, a concern is presented. If the same one of the motors is always selected to provide the largest share of the total torque, that motor and the mechanical components driven by it are likely to wear out faster than the other motors and their associated mechanical components. Less than optimal durability of the drivetrain is the likely result.

Therefore, a system which will provide high efficiency as well as high durability of a multiple-motor drivetrain will provide significant advantages.

SUMMARY OF THE INVENTION

The present invention provides a method for promoting even wear in a multiple-motor drive system, the system having a plurality of drive portions each comprising a drive motor. The method comprises the step of providing a greater share of the total torque provided by the drive system from a first drive portion than from the remaining drive portions. The method further includes the step of generating an indicator of relative wear of the drive portions. Additionally, if the indicator indicates a pre-determined amount of greater wear of the first drive portion than the remaining drive portions, a different drive portion is selected to provide a greater share of total torque than the other drive portions.

The present invention also provides a method for promoting even wear in a two-electric-motor electric vehicle drive system, the system having a first electric motor and a second electric motor. The method comprises the step of accumulating a sum of differential torque-hours between the two motors. If the sum is greater than a first pre-determined threshold, at least 50% of the total torque of the drive system is provided from the second motor. If the sum is greater than a second pre-determined threshold, at least 50% of the total torque of the drive system is provided from the first motor.

The present invention further provides an apparatus for promoting even wear in a multiple-motor drive system, the system having a plurality of drive portions each comprising a drive motor. The apparatus comprises means for providing a greater share of the total torque provided by the drive system from a first drive portion than from the remaining drive portions. Also, the apparatus includes means for generating an indicator of relative wear of the drive portions. In addition, if the indicator indicates a pre-determined amount of greater wear of the first drive portion than the remaining drive portions, the apparatus comprises means for selecting a different drive portion to provide a greater share of total torque than the other drive portions.

The present invention allows for high efficiency as well as high durability of a multiple-motor drive system. In doing so, the present invention provides significant advantages over the prior art.

DETAILED DESCRIPTION OF THE PREFERRED EMBODIMENT

Figure 1:
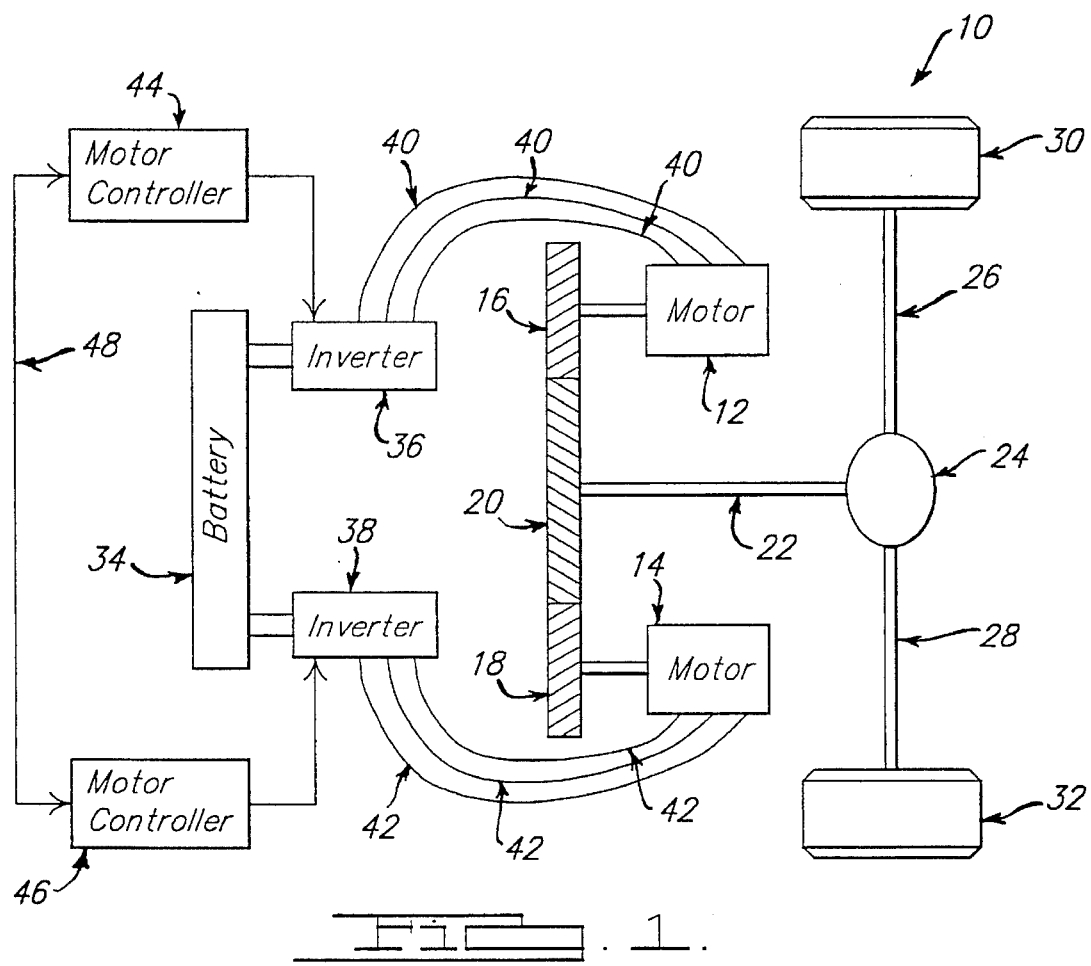
FIG. 1 is an illustration of a drivetrain 10 according to one embodiment of the present invention.

Referring to FIG. 1, a drivetrain 10 for an electric vehicle according to one embodiment of the present invention will be described. Power for motivation of the vehicle is provided by two electric motors 12 and 14, preferably three-phase induction motors. Motors 12 and 14 are coupled to gearing 16 and 18. Gearing 16 and 18 are coupled to gearing 20, preferably with the same gear ratio. Thus, motors 12 and 14 are mechanically coupled and operate at the same speed in this embodiment of the present invention.

Gearing 20 is further coupled to driveshaft 22. Driveshaft 22 is coupled to differential 24, which is in turn coupled to axle shafts 26 and 28. Axle shafts 26 and 28 drive wheels 30 and 32, respectively.

Power for motors 12 and 14 comes from traction battery 34. Direct current (DC) power from traction battery 34 is converted to three-phase alternating current (AC) power by inverters 36 and 38. This power is then provided to motors 12 and 14 by conductors 40 and 42, respectively.

Control of electric motor 12 is performed by motor controller 44. Motor controller 44 controls electric motor 12 by managing the operation of inverter 36. Motor controller 44 is responsible for (among other things) controlling the torque produced by electric motor 12. Likewise, control of motor 14 is performed by motor controller 46, through managing the operation of inverter 38. Motor controller 46 is responsible for controlling the torque produced by electric motor 14. It should be noted that control of induction motors is well-known to the art. The present invention applies independently of the particular motor control method selected. It should also be noted that the functions performed by controllers 44 and 46 can be combined into one controller.

Motor controllers 44 and 46 are each microprocessor-based electronic modules, each preferably employing a Siemens ADC167 microcontroller. However, any microprocessor with sufficient resources (throughput, memory, registers, inputs, outputs, etc.) to perform the functions ascribed herein to motor controllers 44 and 46 will be appropriate. Motor controllers 44 and 46 are able to communicate via data bus 48, preferably a three-wire full-duplex synchronous bus.

Motor controllers 44 and 46 contain essentially the same motor control software. However, in addition to responsibility for motor control, motor controller 44 is responsible for partitioning the total torque to be supplied by motors 12 and 14 into a portion to be supplied by motor 12 and a portion to be supplied by motor 14. Motor controller 44 is aware of total torque to be supplied through either connection to an accelerator pedal position sensor or through communication with a vehicle-level controller which determines total torque to be supplied by motors 12 and 14.

Figure 2:
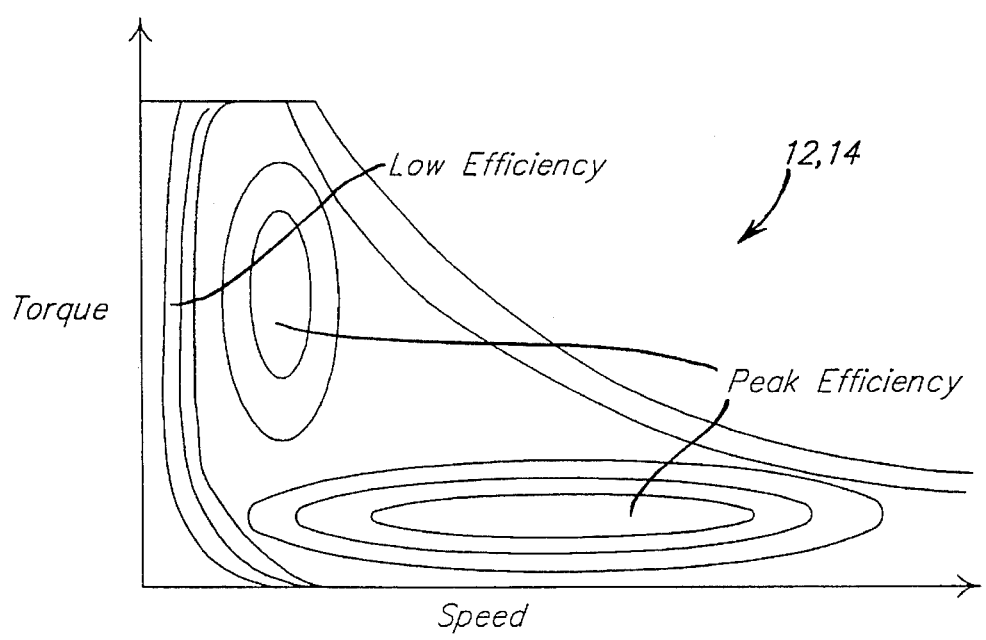
FIG. 2 is a typical efficiency curve, as a function of torque and speed, for motors 12 and 14 of FIG. 1.

The partitioning of torque is illustrated with initial reference to FIG. 2. FIG. 2 is a typical efficiency curve for an induction motor. The curve shows contours of equal efficiency, with higher- and lower-efficiency curves so labelled. For a given motor speed and total torque required, motor controller 44 assigns a fraction of the total torque to each motor 12 and 14 such that the overall efficiency of producing the total torque is a maximum. Because the characteristics of motors 12 and 14 are known a priori when motor controller 44 is programmed, a look-up table can be employed in motor controller 44 to facilitate the partitioning of torque. Such a look-up table would have speed and total torque as independent variables and the resultant two partitioned torques as dependent variables.

It should be noted that a 50%—50% split of torque between the two motors 12 and 14 will rarely result in maximum total efficiency. Actually, it has been observed that for some electric motors, maximum efficiency is obtained under some circumstances by supplying 100% of the total torque from one motor.

Because a 50%—50% split of torque will normally not be most efficient, either motor 12 or motor 14 must be assigned greater than 50% of the total torque when a 50%—50% split is not most efficient. Because of this, the motor with the larger torque (and its associated gearing 16 or 18—see FIG. 1) will experience greater wear than the other motor and associated gearing. As a result, motor controller 14 performs an algorithm which alternates between motors 12 and 14 as being the motor to have the larger assigned torque when a 50%—50% split is not most efficient.

Figure 3:
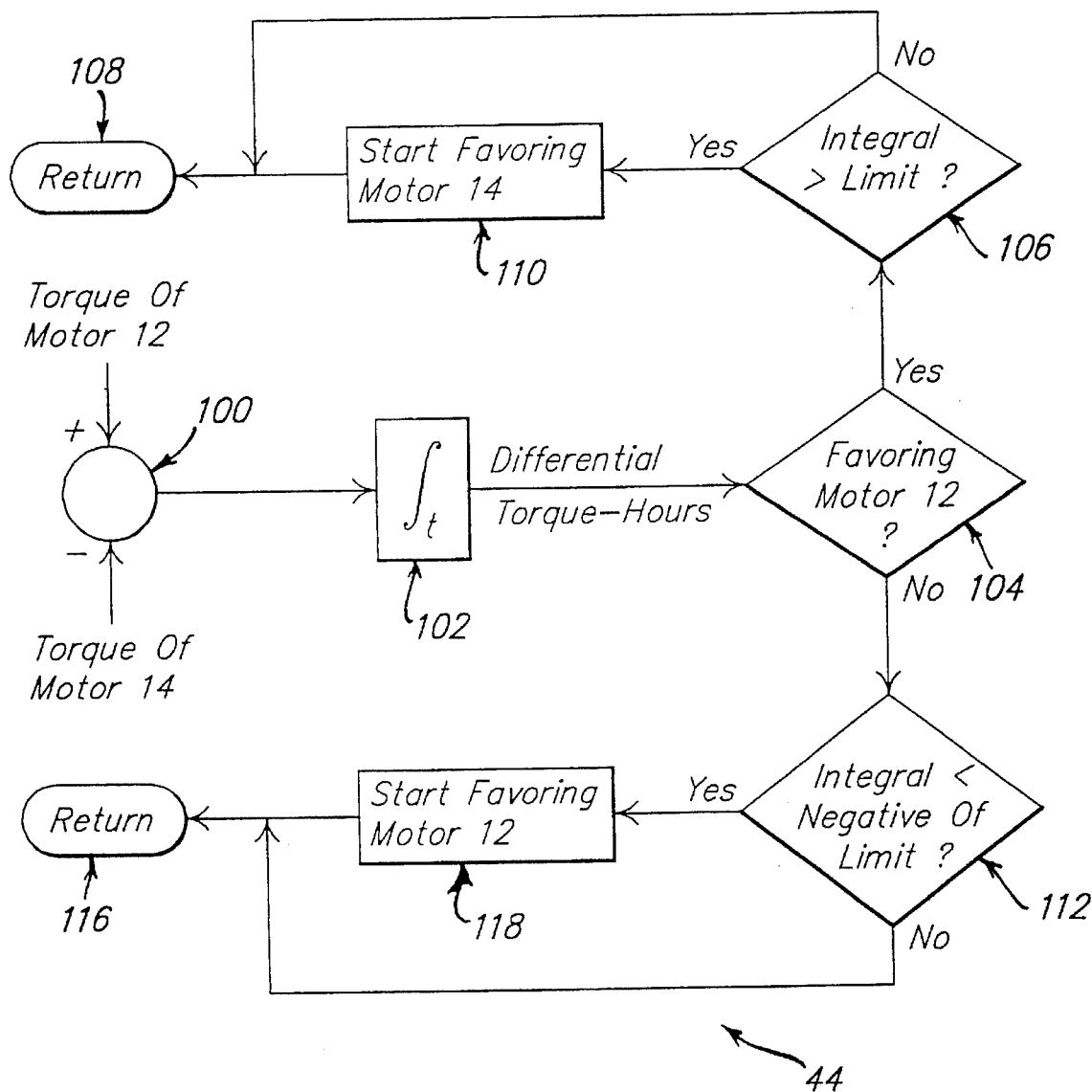
FIG. 3 is an algorithm employed by motor controller 44 of FIG. 1 for promoting even wear within drivetrain 10.

The algorithm performed by motor controller 44 to determine the motor to have the larger assigned torque is illustrated in FIG. 3. At block 100, the difference in torque between motor 12 and motor 14 is calculated. At block 102, the difference is integrated with respect to time, such that the output of block 102 has the units of torque multiplied by time. (For the sake of choosing a unit of time, we will refer to time in units of hours, though of course any units of time can be used.) This output of block 102 is an accumulated total of differential torque-hours supplied by motors 12 and 14. This accumulated total of differential torque-hours is an indicator of relative wear of motor 12 and its associated gearing 16 versus motor 14 and its associated gearing 18.

At block 104, the algorithm determines whether motor 12 is currently being favored (that is, whether motor 12 is currently assigned greater than 50% of total torque). If YES, the algorithm determines whether the accumulated differential torque-hours is greater than a pre-determined limit (step 106). If NO, the algorithm exits at step 108. If YES, the algorithm goes to step 110, where motor 14 is selected to be the favored motor. The algorithm then exits at step 108.

If the result at block 104 was NO, the algorithm proceeds to step 112. There, the algorithm determines whether the accumulated torque-hours are less than a pre-determined limit, preferably the negative of the pre-determined limit employed at step 106. If NO, the algorithm exits at step 116. If YES, the algorithm selects motor 12 to be favored (step 118) and then exits at step 116.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for promoting even wear in a multiple-motor drive system, said method comprising the steps of:

providing a plurality of drive portions each comprising a drive motor;

providing a greater share of the total torque provided by said drive system from a first said drive portion than from each of the remaining one or more said drive portions;

generating an indicator of relative wear of said drive portions;

if said indicator indicates a pre-determined amount of greater wear of said first drive portion than the remaining one or more said drive portions, selecting a different said drive portion to provide a greater share of total torque than each of the other one or more said drive portions.

2. A method as recited in claim 1, wherein said drive motors are electric motors and wherein said step of providing a greater share of the total torque provided by said drive system from a first said drive portion than from each of the remaining one or more said drive portions further comprises:

providing torque-generating electric power to at least one said electric motor.

3. A method as recited in claim 2, wherein said step of generating an indicator of relative wear of said drive portions further comprises:

generating an accumulated difference in torque-hours supplied by each said drive motor.

4. A method as recited in claim 1, wherein said step of generating an indicator of relative wear of said drive portions further comprises:

generating an accumulated difference in torque-hours supplied by each said drive motor.

5. A method for promoting even wear in a two-electric-motor electric vehicle drive system, said system having a first electric motor and a second electric motor, said method comprising:

accumulating a sum of differential torque-hours between said two motors;

if said sum is greater than a first pre-determined threshold, providing at least 50% of total torque of said drive system from said second motor; and if said sum is greater than a second pre-determined threshold, providing at least 50% of total torque of said drive system from said first motor.

6. An apparatus for promoting even wear in a multiple-motor drive system, said system having a plurality of drive portions each comprising a drive motor, said apparatus comprising:

means for providing a greater share of the total torque provided by said drive system from a first said drive portion than from each of the remaining one or more said drive portions;

means for generating an indicator of relative wear of said drive portions;

if said indicator indicates a pre-determined amount of greater wear of said first drive portion than the remaining one or more said drive portions, means for selecting a different said drive portion to provide a greater share of total torque than each of the other one or more said drive portions.

7. An apparatus as recited in claim 6, wherein said drive motors are electric motors.

8. An apparatus as recited in claim 7, wherein said system comprises exactly two drive motors.

9. An apparatus as recited in claim 8, wherein said indicator is an accumulated difference in torque-hours supplied by each said drive motor.

10. An apparatus as recited in claim 9, wherein said drive motors are mechanically coupled.

11. An apparatus as recited in claim 10, wherein said coupling is such that said first drive motor and said second drive motor rotate at substantially the same speed.

12. An apparatus as recited in claim 6, wherein said indicator comprises torque-hours supplied by each said drive motor.

13. An apparatus as recited in claim 7, wherein said indicator comprises torque-hours supplied by each said drive motor.

* * * * *